(12) United States Patent
Parsa et al.

(10) Patent No.: US 6,507,601 B2
(45) Date of Patent: Jan. 14, 2003

(54) COLLISION AVOIDANCE

(75) Inventors: Kourosh Parsa, Riverside, CT (US); Emmanuel Kanterakis, North Brunswick, NJ (US)

(73) Assignee: Golden Bridge Technology, West Long Branch, NJ (US)

( * ) Notice: Subject to any disclaimer, the term of this patent is extended or adjusted under 35 U.S.C. 154(b) by 39 days.

(21) Appl. No.: 09/778,955

(22) Filed: Feb. 8, 2001

(65) Prior Publication Data

US 2001/0055293 A1 Dec. 27, 2001

Related U.S. Application Data

(60) Provisional application No. 60/181,200, filed on Feb. 9, 2000.

(51) Int. Cl.[7] .............................. H04B 1/69; H04B 7/216
(52) U.S. Cl. ....................................... 375/141; 370/441
(58) Field of Search .............................. 375/130, 141, 375/146, 147; 370/441, 433, 342, 335, 461, 445, 448; 455/450, 455

(56) References Cited

U.S. PATENT DOCUMENTS

| 5,581,707 A | | 12/1996 | Kuecken ..................... 707/233 |
| 5,636,123 A | | 6/1997 | Rich et al. .................. 701/207 |
| 5,673,259 A | | 9/1997 | Quick, Jr. ................... 370/340 |
| 5,802,046 A | * | 9/1998 | Scott .......................... 370/280 |
| 5,841,768 A | | 11/1998 | Ozluturk et al. ............ 370/335 |
| 6,163,533 A | * | 12/2000 | Esmailzadeh et al. ...... 370/342 |
| 6,169,759 B1 | | 1/2001 | Kanterakis et al. ......... 375/130 |
| 6,256,301 B1 | | 7/2001 | Tiedemann, Jr. et al. ... 370/342 |
| 6,366,779 B1 | | 4/2002 | Bender et al. .............. 455/450 |

FOREIGN PATENT DOCUMENTS

| WO | 03499 | 1/2000 |
| WO | 08908 | 2/2000 |
| WO | 57663 | 9/2000 |

OTHER PUBLICATIONS

"Start UMTS Services With 3G–GPRS:CPCH/FACH," *Golden Bridge Technology*, Innovations and Technologies, Jun. 27, 2000. PP 1–20.

Kourosh Parsa, Saeed S. Ghassemzadeh, and Saied Kazeminejad, "The Common Packet Channel Considered the $3^{rd}$ Generation GPRS," *System Engineering of Data Services in UMTS W–CMDA Systems, IST Mobile Communications Summit*, Galway, Ireland, Oct. 1–4, 2000.

* cited by examiner

*Primary Examiner*—Tesfaldet Bocure
(74) *Attorney, Agent, or Firm*—McDermott, Will & Emery

(57) ABSTRACT

A code-division-multiple-access (CDMA) system provides a collision avoidance mechanism for packet communications. When mobile stations attempt to establish links with a base station, the base station selects one mobile station to transmit data over an intended uplink channel. The base station transmits a predetermined sequence, during the first frame of the data transmission over the downlink control channel that corresponds to the intended uplink channel. If several mobile stations detect or mis-perceive successful access attempts, those stations begin data transmissions via respective desired uplink channels. At the same time, the mobile stations listen for the known sequence over the various corresponding downlink channels. Upon successful detection of the known sequence, one mobile station continues transmission of its data over the intended channel. However, any contending mobile station that does not detect the known sequence on the appropriate downlink channel immediately stops its data transmission.

20 Claims, 6 Drawing Sheets

COLLISION AVOIDANCE

RELATED APPLICATION

This application claims the benefit of U.S. Provisional Application No. 60/181,200, entitled "CHANNEL ASSIGNMENT AND UE CHANNEL SELECTION METHOD" filed on Feb. 9, 2000, the disclosure of which is entirely incorporated herein by reference.

FIELD OF THE INVENTION

This invention relates to spread-spectrum communications, and more particularly to code-division-multiple-access (CDMA) cellular, packet-switched systems. The inventive concepts involve use of a start of message indicator as a collision avoidance mechanism, to reduce the impact of remote terminal mistakes in perceived successful channel access attempts.

BACKGROUND

Recent developments in wireless communications technologies have allowed expansion of service offerings from the original voice telephone service model to include a number of services supporting packet data communications. As customers become increasingly familiar with data services offered through landline networks, they are increasingly demanding comparable data communications in the wireless domain, for example to maintain service while mobile subscribers roam freely or to provide remote service in locations where wireless loops are preferable to landline subscriber loops. A number of technologies that support packet data communications in the wireless domain utilize code division multiple access (CDMA), which involves direct sequence spread-spectrum encoding. In such systems, different physical channels are defined by use of different channelization and/or spreading codes, as part of the direct sequence modulation process.

A CDMA-based random access channel (RACH) provides uplink packet transport from a mobile station (MS) to a base station (BS), with a random slotted-ALOHA type procedure to access the channel resources. U.S. Pat. No. 6,169,759 to Kanterakis et al. discloses a common-packet channel (CPCH), which provides a similar uplink transport for transmitting variable size packets from a mobile station (MS) to a base station (BS). The disclosure of U.S. Pat. No. 6,169,759 to Kanterakis et al. is entirely incorporated herein by reference.

The RACH and CPCH channels do not need direct resource allocation. The channel resource allocation of these channels is contention based. The mobile station transmits an access preamble corresponding to a channel that the mobile station desires to use. The base station responds with a matching preamble that signals successful access to the selected channel resource.

FIG. 1 is a simplified example of the signals exchanged between a mobile station and a base station for a CPCH service. The mobile station selects one of the available uplink channels through a base station. The access phase involves the MS-spread-spectrum transmitter sending one or more access preambles (AP) over an uplink physical channel, in access slots defined in relation to a frame-timing signal derived from receipt of the common synchronization channel (not shown). The access preamble (AP) contains a signature corresponding to the selected uplink channel, that is to say the one channel that the mobile station is attempting to access from among those available by the base station.

When the base station receives an access preamble (AP) at an adequately detectable power level, it transmits back an acknowledgement (ACK), containing a signature that corresponds to the access preamble signature, over the indicator channel.

The mobile station ceases transmission of the access preamble (AP) when it receives the corresponding ACK signal from the base station. If the mobile station successfully receives the acknowledgement corresponding to the access preamble that the station transmitted, the mobile station proceeds to the next phase in the transmission process, shown generally as transmission of data and control information over the uplink channel in FIG. 1. Alternatively, the mobile station will cease its transmission of access preambles if the mobile station has transmitted the maximum allowed number of access preambles. In this later situation, the mobile station assumes that its access attempt has failed, so the station backs off and waits for some period of time before initiating another access attempt.

As shown in FIG. 2, the message part carried over the downlink physical control channel (DPCCH) is divided into 10 msec frames. Each 10 msec frame is split into 15 slots (0, 1, 2, . . . 14), each of length $T_{slot}$=2,560 chips. As shown, each slot carries 10 bits of information. Each 10-bit slot of the downlink control channel contains fields comprising Pilot, CCC, TFCI and TPC. The TPC field carries transmission power control (TPC) bits. The TFCI field carries the transport format combination indicator, and the CCC filed carries four data bits for CPCH control command information.

Although these CDMA-based communication technologies offer enhanced packet data communications, problems still arise that cause collisions. It has been found that there is roughly a 30% chance that two or more preambles from mobile stations will arrive at the base station in any given 50 ms time-window. One mobile station may then mistake a subsequent acknowledgement signal intended for another mobile station to be one intended for itself. The mistaken mobile station will then transmit its packet on a channel intended for use by another mobile station. This will lead to excessive interference. Moreover, if the mistaken mobile station sends its packet over an already busy channel, there is a great chance of a cell-shut-down. This is extremely undesirable in cellular telephony as users in the neighboring cells will also be adversely affected.

Various methods of collision detection, collision resolution and channel assignment were developed to reduce the occurrences of these collision. A CPCH system, such as that disclosed by Kanterakis et al., utilizes a collision detection phase at the start of the data and control communications over the uplink transportation channel and the downlink control channel, to allocate the uplink channel to a mobile station that successfully avoids collision. If two or more mobile stations are still attempting access to the same channel at the time of the collision detection phase, the base station may respond with at most one matching collision detection preamble, effectively allocating the channel to one mobile station. In some cases, the base station will not be able to resolve the collision detection and will not send back any collision detection preamble. A mobile station that fails to receive its matching collision detection preamble from the base station aborts its access attempt.

The collision detection approach does reduce collision problems. However, none of these methods can totally eliminate the chance of collision due to unintended errors. For example, a mobile station may misinterpret its channel assignment and proceed to transmit in a channel other than the one it was assigned, even though the other channel may be assigned to and in use by a different mobile station. There are several situations that may lead to such a mistake. For example, in CPCH, two mobile stations, $MS_A$ and $MS_B$, have sent in $AP_1$ and $AP_2$, respectively. The base station has only responded with an AP ACK1, which corresponds to $AP_1$. $MS_A$ has correctly identified the ACK, however, $MS_B$ has mistaken the ACK to correspond to AP2. The mistaken mobile station may then proceed with uplink transmission over the channel corresponding to $AP_2$, which may already be in use by another station.

Although the above-described collision detection procedure reduces the probability of such collisions between stations attempting access on the same channel at about the same time, mistakes regarding attempted accesses to different channels still can occur as a result of substantially concurrent collision detection phases for different channels. In this situation, assume that mobile station $MS_B$ is waiting for a collision detection acknowledgement. At about this time, the base station sends a CD acknowledgement for the mobile station $MS_A$ that was attempting to access another channel. The one mobile station $MS_B$, however, mistakes the CD acknowledgement as an acknowledgement of its own CD preamble and begins transmitting over the channel that it is attempting to access, even though that channel may already be in use by another station.

As noted, when a mistaken mobile station starts to transmit a message, it creates excessive interference and may even lead to a cell shut down. Two mobile stations transmitting over the same channel can create instability in the wireless system, because mobile stations need to be closely controlled with regard to their transmit power in any CDMA system. If a mobile station $MS_B$ assumes that it is being power controlled, when in fact it is not, it is possible that the mistaken mobile station will increase its power to an unacceptable level. In the case of a mistaken channel assignment, the power control problem can happen because the mobile station $MS_B$ is mistakenly transmitting on a channel assigned to another mobile station $MS_A$ and any power control information on the corresponding downlink channel is actually intended for a different mobile station. The base station may not be detecting the transmissions of the mistaken mobile station $MS_B$, at all.

As shown by this discussion, there is a need for a technique to avoid collisions in a spread-spectrum packet communication system, which will mitigate the above noted problems, particularly those due to mistaken interpretation of channel assignment by contending mobile stations.

SUMMARY OF THE INVENTION

Hence a general objective of the invention is to reduce the occurrence of colliding transmission of packets within a given uplink physical channel of a wireless packet data communication system, utilizing spread spectrum transmissions.

Another objective of the invention is to provide a technique that will enable a mobile station in such a system to recognize when it may be transmitting on a channel that has not actually been assigned to that mobile station, so that the mistaken station will promptly cease such transmissions.

One aspect of the current invention relates to methods, which can be used as collision resolution mechanisms alone or in combination with other methods commonly known in the art. The methods provide a start of message indicator or other known sequence on the downlink channel. These methods involve transmission of the known sequence at the beginning of transmissions, for example as a start of message indicator, over a downstream channel corresponding to the desired uplink channel. Use of this sequence serves to eliminate mistaken transmission over an intended uplink channel by a mobile station that has misinterpreted access-related signals regarding another channel as an acknowledgment or the like with regard to its accessing of the intended channel.

Accordingly, a first aspect of the present invention, as embodied and broadly described herein, relates to an improvement to operations in a CDMA system which supports packet-switched communication. The CDMA system has a plurality of base stations (BS) and a plurality of mobile stations (MS). For packet-switched based communication, there are also a plurality of uplink transport channels and a plurality of downlink control channels corresponding to each of the plurality of uplink transport channels. The inventive method comprises the steps of one or more mobile stations attempting to establish a link with a base station. At a mobile station, upon a successful or perceived-to-be-successful attempt, the steps include beginning its data transmission via a first uplink transport channel. The selection of the first uplink transport channel can be based on a mobile station self-selection, a base station channel assignment, or other mechanisms commonly known in the art.

At the base station, the steps include receiving attempts from one or more mobile stations to establish links with the base station and selecting an intended mobile station to transmit its data over an intended uplink transport channel. The selection can be on a first-come-first-served basis, on a random basis, or be based on performance factors of the one or more mobile stations. The steps further include transmitting a sequence known to the intended mobile station during the first frame of the data transmission for the intended mobile station over a downlink control channel corresponding to the intended uplink transport channel. The sequence can be repeated for several frames to increase reliability.

When the mobile station begins its data transmission via the first uplink transport channel, it also listens for the known sequence to the transmitted over the downlink control channel corresponding to the first uplink transport channel. Upon successful detection of the known sequence by the mobile station, the steps include continuing transmission of its data over the first uplink transport channel. However, upon no detection of the known sequence by the mobile station, for example within a predetermined interval following the start of data transmission, the mobile station shuts off its uplink data transmission immediately.

The inventive collision avoidance technique admits of a wide range of variations and applications. For example, the preferred embodiments involve application to CDMA type wireless communications, particularly for CPCH-based packet data services. However, the invention may find application to packet data communications in other types of digital wireless networks. Other aspects of the invention relate to implementations of base stations and mobile stations, which take advantage of the inventive collision avoidance techniques.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
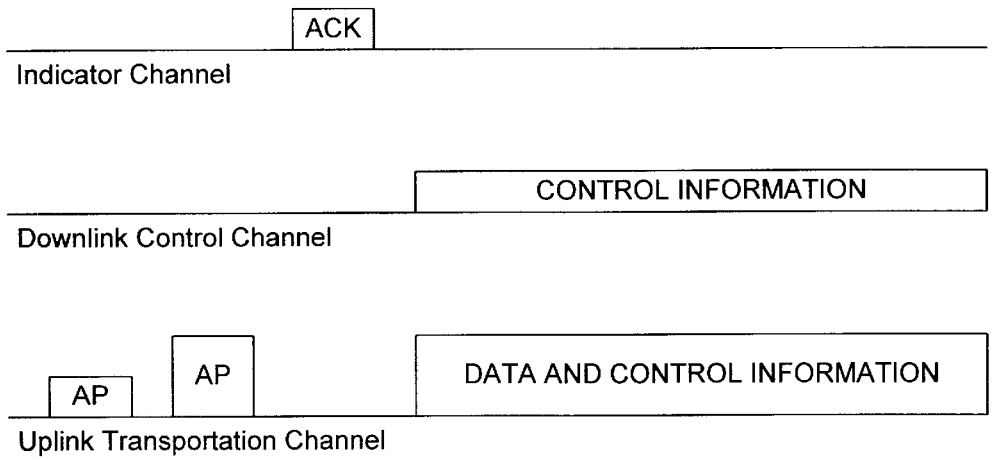
FIG. 1 is a simplified timing diagram illustrating the signals communicated in the indicator channel, the downlink control channel and the uplink transport channel of a prior art common packet channel (CPCH) system.

Reference now is made in detail to the present preferred embodiments of the invention, examples of which are illustrated in the accompanying drawings, wherein like reference numerals indicate like elements throughout the several views.

The present invention introduces a collision avoidance mechanism known as the "Start of Message Indicator (SMI)" following access and/or collision detection phases in wireless packet data services. It is assumed that there is a one-to-one ratio between uplink and downlink channels, that is to say each uplink physical channel has a corresponding downlink control channel. After the access procedures are performed for a particular uplink channel, the base station (BS) transmits a predetermined sequence serving as an SMI, during the first frame or the first few frames of transmission on the downlink control channel that corresponds to the particular physical uplink channel. If the mobile station did not hear the SMI on the corresponding downlink control channel during the first frame (or first few frames), it knows that it has made a mistake and will back off immediately. Conversely, a mobile station detecting the SMI on the corresponding downlink control channel during the first frame can proceed with its packet data transmissions over the assigned uplink channel.

With the inventive collision avoidance technique, after the access procedures are performed for a particular uplink channel, the base station (BS) transmits a predetermined sequence, during the first frame of transmission on the downlink control channel corresponding to the particular physical uplink channel. The predetermined sequence can be [1111] in a 4-bit field, or any other fitting bit or code sequence. If the MS did not hear the SMI on the corresponding downlink control channel during the first frame, it knows that it has made a mistake and will back off immediately.

The inventive collision avoidance mechanism, with the "Start of Message Indicator (SMI)," can be used on any packet access protocol that has the one-to-one correspondence of the uplink physical channel to a downlink control channel. A preferred embodiment applies this technique to a CPCH service similar to that disclosed by Kanterakis et al., although the technique is applicable to other wireless packet services.

In a preferred embodiment of a system implementing the invention (FIG. 3), the CDMA system comprises a radio network controller (RNC) 11, a plurality of base stations 13 and a plurality of mobile stations 15. Each base station (BS) 13 has BS-spread-spectrum transmitter and a BS-spread-spectrum receiver, shown as a single transceiver (XSCV'R) system 17 for simplicity in this drawing. Each of the mobile stations (MS) 15 has an MS-spread-spectrum transmitter and an MS-spread-spectrum receiver (not separately shown). Exemplary transmitters and receivers for use in the BS and MS network elements are discussed in more detail below with regard to FIGS. 6 and 7, as will be discussed more, later. The terms "mobile station" and "remote station" are used interchangeably to refer to the remote wireless devices. In most applications, the remote stations provide mobility, although in some services the remote device may remain stationary, e.g., in a wireless loop application.

In a typical embodiment, the radio network controller (RNC) 11 provides two-way packet data communications to a wide area network, shown by way of example as a packet-switched network 19. The RNC 11 and the network 19 provide the MS units 15 with two-way packet data communications services to enable communication to and from devices, represented by way of example by the IP telephone 21, the personal computer (PC) 23 and the server 25. In this preferred embodiment, the wireless system provides packet data communication services using a plurality of CPCH channels. Each common-packet channel CPCH through the system is an uplink transport channel for transmitting variable size packets from a mobile station (MS) 15 to a base station (BS) 13.

Upon power-up, an MS 15 searches for a transmission from any nearby BS 13. Upon successful synchronization with one or more BSs, the MS 15 receives the necessary system parameters from a continuously transmitted BS broadcast control channel (BCCH), which is broadcast by all base stations 13. Using the information transmitted from the BCCH, the MS 15 can determine various parameters required when first transmitting to a BS. Parameters of interest are the loading of all the base stations in the vicinity of the MS, their antenna characteristics, spreading codes used to spread the downlink transmitted information, timing information and other control information. With this information, the MS 15 can transmit specific waveforms in order to capture the attention of a nearby BS 13.

Figure 3:
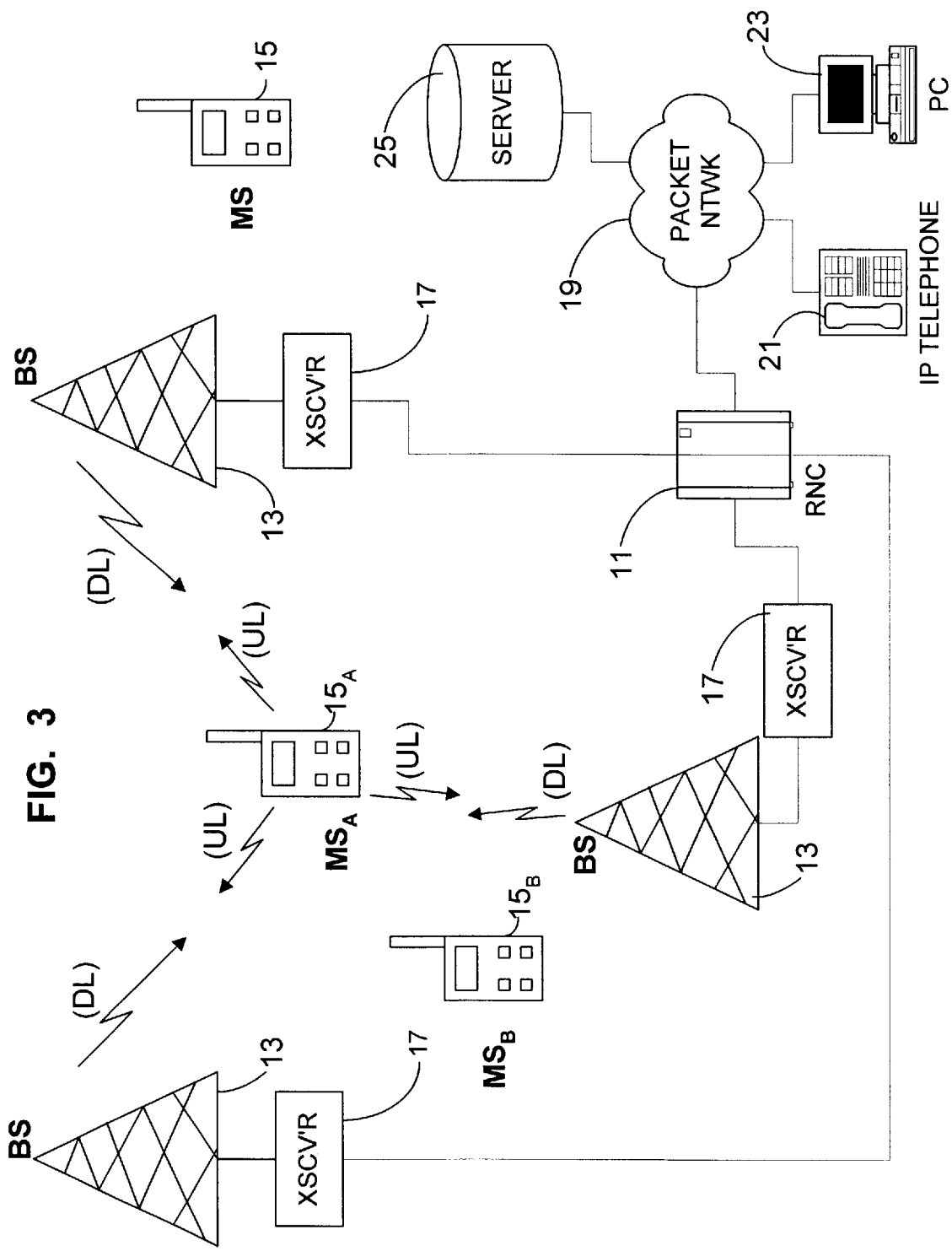
FIG. 3 is a functional block diagram of a CDMA network, capable of implementing the communications in accord with the present invention.
Figure 4:
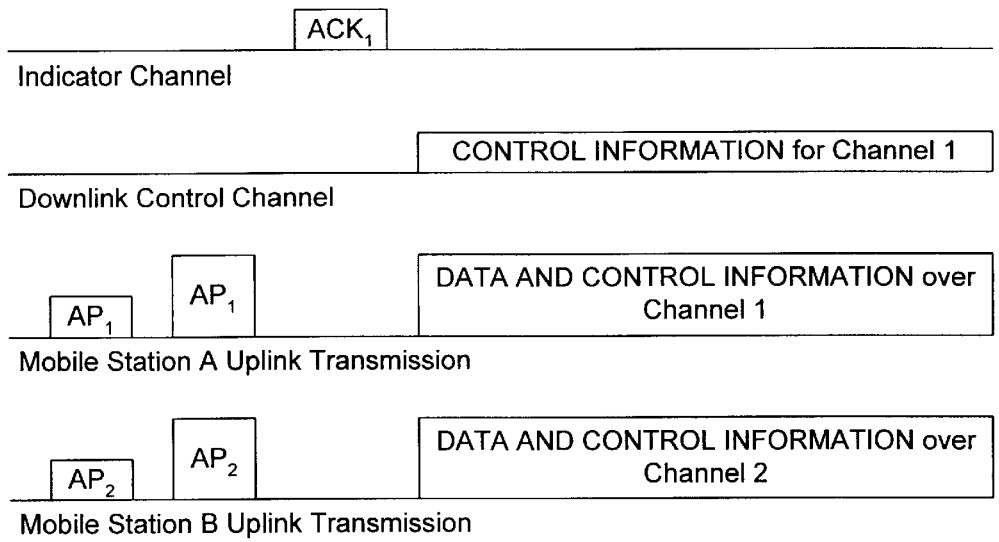
FIG. 4 is a simplified timing signal diagram illustrating access procedures, with the potential for a false or mistaken mobile transmission, in the system of FIG. 3.

FIG. 4 shows the timing of signals over two of the uplink channels, one downlink control channel and an indicator channel. Consider now a simple access procedure by mobile stations MSA 15A and MSB 15B (FIG. 3) producing the signals as shown in FIG. 4. In the example, the first mobile station (MS$_A$) 15$_A$ transmits one of more access preambles (AP$_1$), in access slots defined in relation to a frame-timing signal derived from receipt of the common synchronization channel (not shown). The access preambles here are preferred examples of signals that the mobile stations may send signifying an attempt to access a channel. This first access preamble (AP$_1$) contains a signature corresponding to the uplink channel selected by the first mobile station (MS$_A$) 15$_A$. Preferably, the access preambles are transmitted repeatedly at increasing power levels.

At about the same time the second mobile station (MSB) 15$_B$ transmits one of more access preambles (AP$_2$), in the appropriate access slots. This second access preamble (AP$_2$) contains a signature corresponding to the uplink channel selected by the second mobile station (MS$_B$) 15$_B$. In this example, the two uplink channels are different.

When the base station receives one of the first access preambles (AP$_1$) at an adequately detectable power level, it transmits back an acknowledgement (ACK$_1$), containing a signature that corresponds to the signature in the first access preamble (AP$_1$), over the indicator channel. Upon receipt of the acknowledgement (ACK$_1$), the first mobile station (MS$_A$) 15$_A$ can then transmit data and control information over the selected first channel, and the base station 15 will transmit control information over the corresponding first downlink control channel. In a CPCH system, the control information transmitted over the corresponding uplink and downlink channels relates to closed loop power control of the transmissions.

In this example (FIG. 4) the base station does not acknowledge the access attempt with regard to the second uplink channel, for example because that channel may already be in use. The second mobile station (MS$_B$) 15$_B$, however, may mistake the acknowledgement (ACK$_1$) as an acknowledgement of its own access preamble (AP$_2$) for the second channel. If so, then the mistaken second mobile station (MS$_B$) 15$_B$ transmits data and control information over the selected second channel, to which it has not been assigned.

Figure 5:
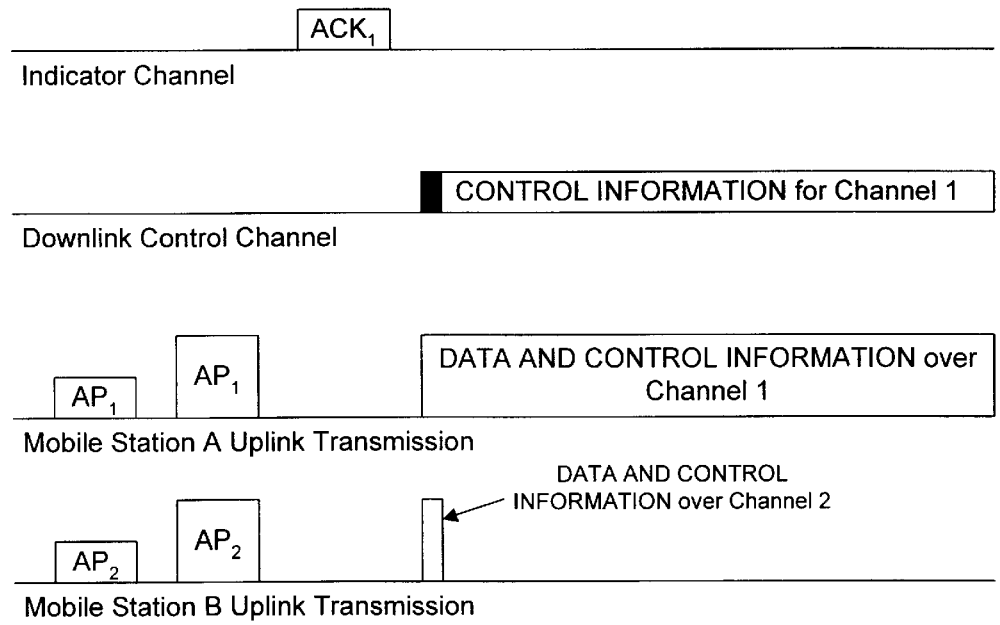
FIG. 5 is a simplified timing signal diagram illustrating access procedures in the system of FIG. 3 with the inventive collision avoidance technique.

FIG. 5 shows the timing of signals over two of the uplink channels, one downlink control channel and an indicator channel, with the addition of the inventive SMI signal. Consider again the simple access procedure by mobile stations MS$_A$ 15$_A$ and MS$_B$ 15$_B$ (FIG. 3). In the example of FIG. 5, the first mobile station (MS$_A$) 15$_A$ transmits one of more access preambles (AP$_1$), each of which contains a signature corresponding to the first uplink channel selected by the first mobile station (MS$_A$) 15$_A$. At about the same time the second mobile station (MS$_B$) 15$_B$ transmits one of more access preambles (AP$_2$), each of which contains a signature corresponding to the second uplink channel.

Again, the base station receives one of the first access preambles (AP$_1$) at an adequately detectable power level; and in response, the base station transmits back an acknowledgement (ACK$_1$), containing a signature that corresponds to the signature in the first access preamble (AP$_1$), over the corresponding indicator channel.

Figure 2:
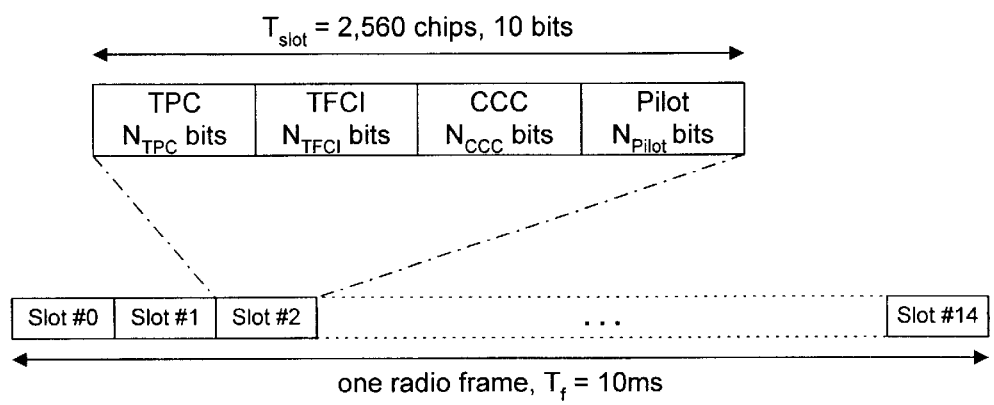
FIG. 2 is an illustration of the Frame Structure of Dedicated Physical Control Channel (DPCCH) in a prior art CPCH system.

There is a one-to-one correspondence of each uplink transmission channels to one of the downlink control channels. The "Start of Message Indicator (SMI)" comprises a predetermined bit or code sequence, transmitted during the first frame of transmission on the downlink control channel corresponding to the particular physical uplink channel. The predetermined sequence can be [1111] in a 4-bit field, or any other convenient bit or code sequence. This sequence can be sent over the TFCI field, but preferably the SMI sequence is sent as data bits in the CCC data field of the downlink control channel (FIG. 2).

Upon receipt of the acknowledgement (ACK$_1$), the first mobile station (MS$_A$) 15$_A$ begins transmitting data and control information over the selected first channel. Concurrently, the base station 15 will transmit control information over the corresponding first downlink control channel. As part of the downlink transmission, the base station sends the SMI sequence in the first one or more frames. The first mobile station (MS$_A$) 15$_A$ recognizes the SMI on the downlink channel corresponding to its assigned uplink channel and continues to transmit over the first uplink channel as shown.

In general, if a mobile station does not hear the SMI on the corresponding downlink control channel during the time period for the first frame, it knows that it has made a mistake and will back off immediately. Continuing with the specific example, now assume that the second mobile station (MS$_B$) 15$_B$ mistakes the acknowledgement (ACK$_1$) as an acknowledgement of its own access preamble (AP$_2$) for the second channel. The second mobile station (MS$_B$) 15$_B$ begins to transmit data and control information over the selected second channel. However, the second mobile station (MS$_B$) 15$_B$ concurrently listens for an SMI signal over the downlink channel corresponding to the second uplink channel. Since the base station has not assigned the second channels to the second mobile station (MS$_B$) 15$_B$, the base station does not transmit the SMI signal over the second downlink channel (not shown) at this time.

The second mobile station (MS$_B$) 15$_B$ waits a predetermined time, after which the second mobile station (MS$_B$) 15$_B$ interprets the failure to receive the SMI over the second downlink channel as an indication that it has not been assigned to use the second uplink channel. At this point, the second mobile station (MS$_B$) 15$_B$ essentially knows that it has made a mistake in its attempt to access the second uplink channel and backs off. The second mobile station (MS$_B$) 15$_B$ therefore promptly ceases its transmission over the second uplink channel (see bottom line in FIG. 5).

As shown by this example, two mobile stations, MS$_A$ and MS$_B$, have sent access preambles AP$_1$ and AP$_2$, respectively, for two different channels. The base station has only responded with an AP ACK$_1$, which corresponds to the access preamble AP$_1$. MS$_A$ has correctly identified the ACK, however, MS$_3$ has mistaken the ACK to correspond to AP$_2$. Now, when these two mobile stations proceed to transmit their messages, MS$_A$ will hear a predetermined sequence over the DPCCH that corresponds to its assigned uplink channel and therefore will continue its transmission. The other mobile station MS$_B$, on the other hand, will NOT hear the predetermined sequence over the DPCCH that corresponds to the uplink channel it is attempting to use, and will immediately back off its message transmission.

The inventive collision avoidance mechanism, with the "Start of Message Indicator (SMI)," can be used on any packet access protocol that has the one-to-one correspondence of the uplink physical channel to a downlink control channel. This technique is not limited to CPCH, although CPCH is a preferred embodiment. The specific example involved data and control transmissions immediately following the access phase, however, the SMI may be used in combination with a collision detection phase, as in the preferred types of CPCH systems. As another example, it is immaterial whether the mobile station requests a channel or the base station assigns a channel. Similarly, whether the access preamble (AP) contains a specific User ID or not should not matter. In all of these cases and in other types of wireless access procedures, the invention is still applicable.

To ensure a complete understanding of the invention, it may be helpful to consider the structure of preferred embodiments of the base station transceivers and the mobile station transceivers, particularly for use in a preferred CPCH implementation of the collision avoidance invention.

Figure 6:
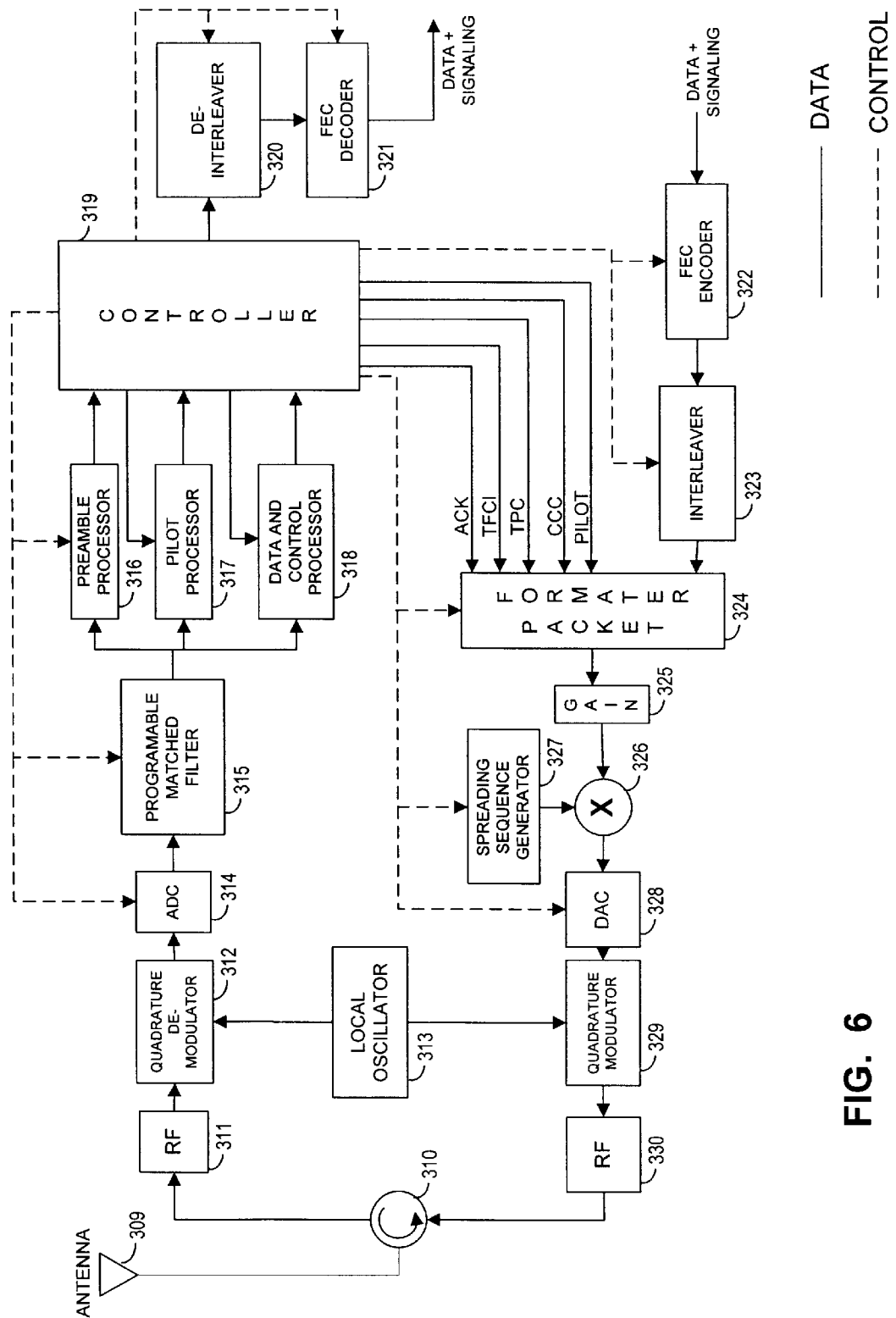
FIG. 6 is a functional block diagram of the transceiver elements (PHY layer) of a spread spectrum base station for use in a network of the type shown in FIG. 3.

FIG. 6 illustrates a presently preferred embodiment of a BS spread-spectrum transmitter and a BS spread-spectrum receiver, essentially in the form of a base-band processor for performing the PHY layer functions for a base station. The BS spread-spectrum transmitter and the BS spread-spectrum receiver form one of the transceivers 17 at a base station 13. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321. The decoder 321 outputs data and signaling received via the UL channel to the MAC layer elements (not shown).

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, the programmable-matched filter 315, the preamble processor 316, the digital-to-analog converter 328, the spreading sequence generator 327, the variable gain device 325, the packet formatter 324, the de-interleaver 320, the FEC decoder 321, the interleaver 323 and the FEC encoder 322. The controller 319 also supplies signaling bits to the packet formatter 324.

The drawing shows the PHY layer elements of the base station. The higher layer elements may comprise a processor at the base station or at a base station controller. The higher layer elements may also include certain processing and control elements at the radio network controller (RNC).

A received spread-spectrum signal from antenna 309 passes through circulator 310 and is amplified and filtered by the receiver RF section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. These functions are well known in the art, and variations to this block diagram can accomplish the same functions.

The programmable-matched filter 315 despreads the received spread-spectrum signal components. A correlator, as an alternative, may be used as an equivalent means for despreading the received spread-spectrum signal.

The preamble processor 316 detects the preamble portion of the received spread-spectrum signal. The pilot processor 317 detects and synchronizes to the pilot portion of the received spread-spectrum signal. The data and control processor 318 detects and processes the data portion of the received spread-spectrum signal. Detected data passes through the controller 319 to the de-interleaver 320 and FEC decoder 321. Data and signaling from the UL are outputted from the FEC decoder 321 to the higher layer elements in or associated with the BS 13.

In the BS transceiver, the MAC layer elements (not shown) supply data and signaling information, intended for DL transmission, to the input of the FEC encoder 322. For purposes of the present discussion, the data could include the SMI in the first one or more frames. The signaling and data are FEC encoded by FEC encoder 322, and interleaved by interleaver 323. In the illustrated embodiment, the controller 319 supplies the ACK, TFCI, TPC, CCC and pilot to the packet formatter 324. Preferably, these include the SMI, for example in the CCC bits for the first frame or the first few frames.

The packet formatter 324 formats data, signaling, acknowledgment signal, collision detection signal, pilot signal and transmitting power control (TPC) signal into appropriate packets. Each packet is outputted from the packet formatter 324, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The modulated DL packet is translated to a carrier frequency, filtered and amplified by the transmitter RF section 330, and then it passes through the circulator 310 and is radiated by antenna 309.

Figure 7:
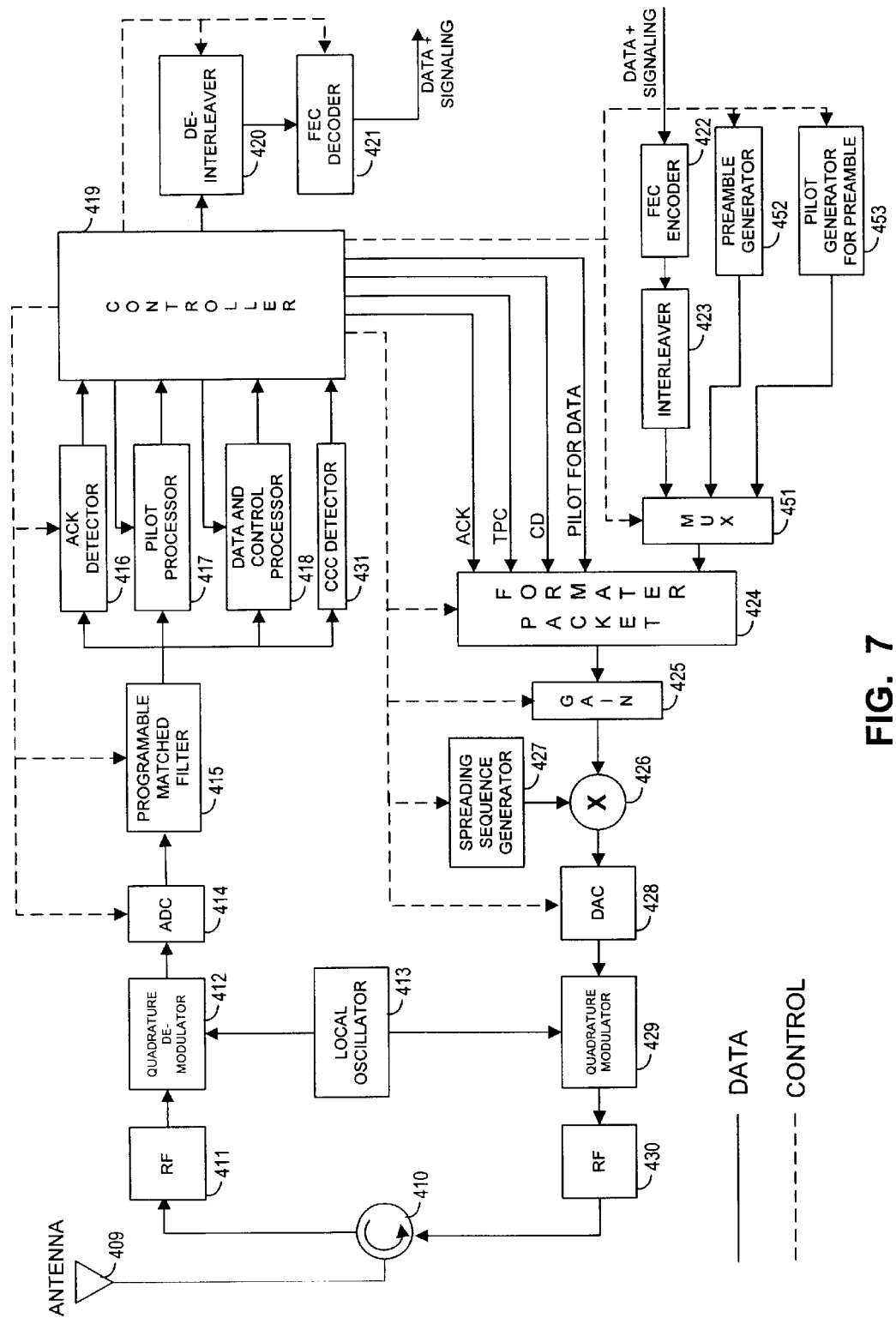
FIG. 7 is a functional block diagram of the transceiver elements (PHY layer) of a spread spectrum remote or mobile station for use in a network of the type shown in FIG. 3.

FIG. 7 shows an embodiment of an MS spread-spectrum transmitter and an MS spread-spectrum receiver, essentially in the form of a base-band processor for performing the PHY layer transceiver functions for a mobile station. The MS spread-spectrum transmitter and the MS spread-spectrum receiver are located at one of the remote or mobile stations (MS) 15, shown in FIG. 5. The MS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421. The decoder 421 outputs data and signaling received via the DL channel to the MAC layer elements (not shown) of the MS. In the illustrated embodiment, a CCC detector 431 detects the data bits in the CCC field and supplies those bits to the controller 419, for example, to enable the controller to recognize the SMI sequence.

The MS spread-spectrum transmitter includes a forward-error-correction (FEC) encoder 422 coupled to an interleaver 423. A packet formatter 424 is coupled through a multiplexer 451 to the interleaver 423. The packet formatter 424 also is coupled to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, the programmable-matched filter 415, the acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through a circulator 410 and is amplified and filtered by the receiver RF section 411. The local oscillator 413 generates a local signal, which the quadrature demodulator 412 uses to demodulate in-phase and quadrature phase components of the received spread-spectrum signal. The analog-to-digital converter 414 converts the in-phase component and the quadrature-phase component to digital signals. These functions are well known in the art, and variations to this block diagram can accomplish the same functions.

The programmable-matched filter 415 despreads the received spread-spectrum signal components. A correlator, as an alternative, may be used as an equivalent means for despreading the received spread-spectrum signal.

The acknowledgment detector 416 detects the acknowledgment in the received spread-spectrum signal. The pilot processor 417 detects and synchronizes to the pilot portion of the received spread-spectrum signal. The data and control processor 418 detects and processes the data portion of the received spread-spectrum signal. Detected data passes through the controller 419 to the de-interleaver 420 and FEC decoder 421. Data and signaling from the DL are outputted from the FEC decoder 421 to the higher level elements in or associated with the MS 15. This output of received downlink data includes the SMI in one or more of the initial frames, in a successful access procedure. The higher level elements could recognize the SMI and determine to continue the associated uplink transmissions. In the illustrated embodiment, however, the controller 419 recognizes the SMI in the bits detected by the CCC detector 431.

In the MS transceiver, the MAC layer elements (not shown) supply data and signaling information intended for transmission over the UL channel, to the input of the FEC encoder 422. Data and signaling information are FEC encoded by FEC encoder 422, and interleaved by interleaver 423. The preamble generator 452 generates a preamble, and the pilot generator 453 generates a pilot for the preamble. The multiplexer 451 multiplexes the data, preamble and pilot, and the packet formatter 424 formats the preamble, pilot and data into a common-packet channel packet. Further, the packet formatter 424 formats data, signaling, acknowledgment signal, collision detection signal, pilot signal and TPC signal into a packet. The packet formatter 424 outputs the packet, and the packet level is amplified or attenuated by variable gain device 425. The packet is spread-spectrum processed by product device 426, with a spreading chip-sequence from spreading-sequence generator 427. The packet is converted to an analog signal by digital-to-analog converter 428, and quadrature modulator 429 using a signal from local oscillator 413 generates in-phase and quadrature-phase components. The modulated UL packet is translated to a carrier frequency, filtered and amplified by the transmitter RF section 430 and then it passes through the circulator 430 and is radiated by the antenna 409.

Using PHY layer elements such as shown in FIG. 7, one or more mobile stations attempt to establish link with a base station, for example, by transmitting access preambles and awaiting receipt of corresponding acknowledgements. The base station selects an intended mobile station to transmit data over an intended uplink transportation channel. The PHY layer elements of the base station transceiver (FIG. 6) then transmit a sequence, that is to say the SMI sequence, during the first frame of the data transmission of the intended mobile station over the downlink control channel corresponding to the intended uplink transportation channel.

The SMI responsive control functions could be implemented by the controller 419. In an alternative embodiment, the SMI related detection and control functions are performed by a processor of the higher layer elements (not shown) of the mobile station.

Upon a successful or perceived-to-be-successful attempt, a remote station (FIG. 7) begins its data transmission via a first uplink transportation channel, while at the same time that station detects the known SMI sequence over the downlink control channel corresponding to the first uplink transportation channel. Upon successful detection of the known sequence, the mobile station continues transmission of its data.

However, another mobile station that mistakenly perceived a successful attempt to access a second channel also begins its data transmission via the uplink transportation channel. However, as this second mobile station begins to communicate over the second uplink transportation channel, it detects a failure to receive the known SMI sequence over the second downlink channel. Upon failure to detect the known sequence, the second mobile station shuts off its data transmission immediately.

Figure 8:
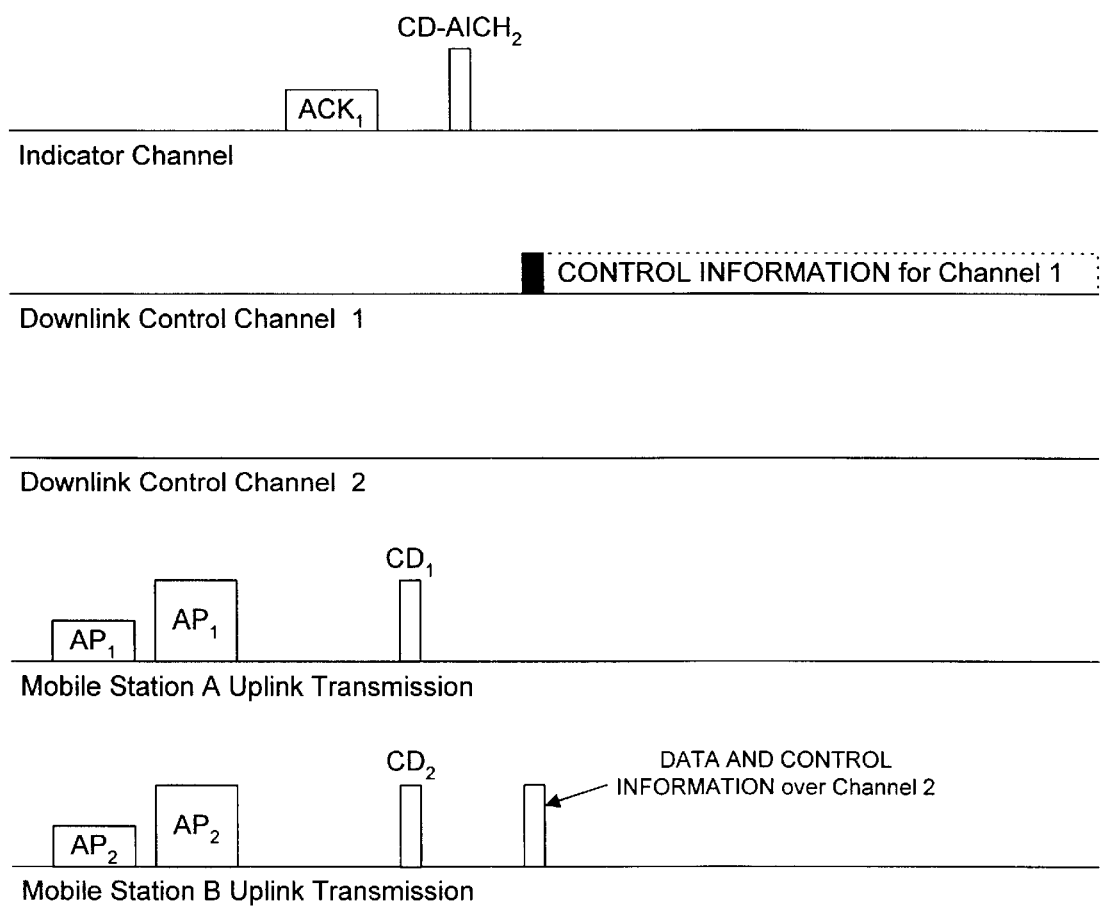
FIG. 8 is a simplified timing signal diagram illustrating access procedures in the system of FIG. 3 with the inventive collision avoidance technique in combination with a collision detection phase.

As noted earlier, the invention is applicable to other channel access technologies, for example in combination with a collision detection phase. FIG. 8 shows the timing of signals in an inventive implementation of the access procedure, which also includes a collision detection phase. This drawing shows the signals transmitted over two of the uplink channels and two of the downlink control channels. The drawing only shows one indicator channel, for convenience.

In the example of FIG. 8, the first mobile station ($MS_A$) $15_A$ (FIG. 3) transmits one of more access preambles ($AP_1$), each of which contains a signature corresponding to the first uplink channel selected by the first mobile station ($MS_A$) $15_A$. At about the same time the second mobile station ($MS_B$) $15_B$ transmits one of more access preambles ($AP_2$), each of which contains a signature corresponding to the second uplink channel.

The base station acknowledges only one access attempt in any given time slot. Assume in our example that the base station receives one of the first access preambles ($AP_1$) at an adequately detectable power level, and it transmits back an acknowledgement ($ACK_1$) containing a signature that corresponds to the signature in the first access preamble ($AP_1$). In parallel, the base station may receive one of the second access preambles ($AP_2$) from the second mobile station at an adequately detectable power level. However, since the base station can respond to only one mobile station at a time, the base station will not transmit back an acknowledgement responsive to the second access preamble ($AP_2$).

The two mobile stations receive the acknowledgement. The first station ($MS_A$) $15_A$ properly assumes that it has successfully passed the access phase with respect to the respective intended uplink channel. The second mobile station ($MS_B$) $15_B$ should assume that its access attempt failed. However, it is possible that the second mobile station ($MS_B$) $15_B$ may mistake the acknowledgement ($ACK_1$) signal as an acknowledgement of its attempt to access the second channel. In such a situation, both mobile stations now initiate a collision detection phase.

In the collision detection phase, each mobile station randomly selects one of a plurality of collision detection preambles and transmits the selected preamble to the base station. In the example, the first mobile station ($MS_A$) $15_A$ (FIG. 3) transmits its selected $CD_1$ preamble. In the example, the mistaken second mobile station ($MS_B$) $15_B$ (FIG. 3) transmits its selected $CD_2$ preamble, at the same time that the first third mobile station ($MS_A$) $15_A$ transmits its selected $CD_1$ preamble over the first uplink channel.

The base station attempts to decode collision detection preambles, in an attempt to select one station and thereby resolve collisions in a manner allowing one of the contending stations to access the channel resource. If the base station can not resolve a collision, it will not acknowledge any of the collision detection preambles. However, if it can resolve the collision, the base station normally sends back a corresponding acknowledgement (CD-AICH) over the indicator channel. Typically, the CD-AICH signal is a copy of the selected CD preamble, but other signals corresponding to the CD preamble could be used for the collision detection acknowledgement.

Because of the error by the second mobile station ($MS_B$) $15_B$ in our example, the base station may not know that the two collision detection preambles relate to attempts to access two different uplink channels. Normally, the base station selects and acknowledges the CD preamble received via the authorized uplink channel, that is to say the first uplink channel in this example. In the example, however, the base station assumes that the two collision detection preambles relate to access attempts for the first uplink channel, therefore the base station selects one of those preambles for acknowledgement. In the example, the base station selects the $CD_2$ preamble and sends a corresponding acknowledgement ($CD-AICH_2$) over the indicator channel.

In the normal situation any one of the contending mobile stations, upon failing to receive a corresponding collision detection acknowledgement, would refrain from transmission over the respective uplink channel. In the example, the first mobile station ($MS_A$) $15_A$ recognizes that it has not received an acknowledgement corresponding to its collision detection preamble $CD_1$ and refrains from transmission over the first uplink channel.

However, the base station has authorized communication over the first uplink channel and begins transmission over the corresponding downlink channel (see second line in FIG. 8). When the second mobile station ($MS_B$) $15_B$ detects the acknowledgement $CD-AICH_2$ from the base station, that mobile station assumes that it has successfully completed the collision detection phase and has been assigned the intended uplink channel, that is to say transmission channel 2 in our example.

The second mobile station ($MS_B$) $15_B$ begins to transmit data and control information over the selected second uplink channel. However, the second mobile station ($MS_B$) $15_B$ concurrently listens for an SMI over the second downlink channel. Since the base station has not assigned the second channel to the second station, the base station does not transmit the SMI signal over the second downlink channel at this time. In accord with the invention, the second mobile station ($MS_B$) $15_B$ waits a predetermined time, after which the second mobile station ($MS_B$) $15_B$ interprets the failure to receive the SMI over the second downlink channel as an indication that it has not been assigned to use the second uplink channel. The second mobile station ($MS_B$) $15_B$ therefore recognizes its mistake and promptly ceases its transmission over the second uplink channel (see next to last line in FIG. 8).

When the base station fails to receive any uplink signals on the first channel, it may cease its transmission on the first downlink channel.

Both mobile stations will recognize that their attempt to access uplink channels failed. Both mobile stations will wait for a period of time, randomly selected by each station, and then begin the process again.

The invention admits of a wide range of variations and applications. For example, the preferred embodiments involve application to CDMA type wireless communications. However, the invention may find application to packet data communications in other types of digital wireless networks.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. In a code-division-multiple-access (CDMA) system employing spread-spectrum modulation comprising a base station (BS) comprising a BS-spread-spectrum transmitter and a BS-spread-spectrum receiver, and a plurality of mobile stations, each mobile station (MS) comprising an MS-spread-spectrum transmitter and an MS-spread-spectrum receiver, a method comprising the steps of:

transmitting from the MS-spread-spectrum transmitter of one of the mobile stations an access preamble signal signifying an attempt to access an intended one of a plurality of uplink transmission channels;

receiving the access preamble via the BS-spread-spectrum receiver, at the base station;

responsive to receipt of the access preamble signal, transmitting an acknowledgment signal corresponding to the access preamble signal from the BS-spread-spectrum transmitter of the base station;

receiving the acknowledgment signal at the MS-spread-spectrum receiver of the one mobile station;

transmitting from the MS-spread-spectrum transmitter of the one mobile station a spread-spectrum signal comprising at least one of data and control information, over the one intended uplink transmission channel, responsive to the receipt of the acknowledgment signal;

transmitting a predetermined sequence from the BS-spread-spectrum transmitter, over a downlink channel corresponding to the one intended uplink transmission channel; and continuing the transmitting from the MS-spread-spectrum transmitter of the one mobile station over the one intended uplink transmission channel, only upon successful reception of the predetermined sequence over the downlink channel corresponding to the one intended uplink transmission channel at the MS-spread-spectrum receiver of the one mobile station.

2. A method as in claim 1, further comprising the steps of:

perceiving a signal received at the MS-spread-spectrum receiver of another mobile station as an acknowledgment of an attempt by said another mobile station to access another one of a plurality of uplink transmission channels;

transmitting from the MS-spread-spectrum transmitter of said another mobile station a spread-spectrum signal comprising at least one of data and control information, over said another intended uplink transmission channel, responsive to the perceived acknowledgment;

waiting for receipt of the predetermined sequence from the base station, at the MS-spread-spectrum receiver of said another mobile station, over a downlink channel corresponding to said another intended uplink transmission channel; and stopping the transmitting from the MS-spread-spectrum transmitter of said another mobile station over said another intended uplink transmission channel, if the predetermined sequence is not received over the downlink channel corresponding to said another intended uplink transmission channel.

3. A method as in claim 1, wherein:

the step of transmitting an access preamble signal comprises the steps of transmitting a plurality of access preambles at sequentially increasing power levels, each transmitted access preamble comprises a signature corresponding to the intended one of a plurality of uplink transmission channels; and the step of receiving the access preamble signal comprises detecting a first one of the access preambles that is received at the BS-spread-spectrum receiver at an adequate power level.

4. A method, of collision avoidance in a wireless digital multiple-access communication system, comprising the steps of:

transmitting a preamble signal as part of an attempt to access an intended one of a plurality of wireless uplink transmission channels of the system from a wireless digital remote station;

receiving an acknowledgement signal at the wireless digital remote station from a base station of the system, and perceiving the received acknowledgement signal as an acknowledgment corresponding to the transmitted preamble signal;

transmitting from the wireless digital remote station a signal comprising at least one of data and control information, over the one intended uplink transmission channel, responsive to the received acknowledgement signal;

if a predetermined sequence is received at the wireless digital remote station over a downlink channel corresponding to the one intended uplink transmission channel within a specified time interval, then continuing the transmission from the wireless digital remote station over the one intended uplink transmission channel; and if the predetermined sequence is not received at the wireless digital remote station over the downlink channel corresponding to the one intended uplink transmission channel within the specified time interval, then stopping the transmission over the one intended uplink transmission channel.

5. A method as in claim 4, wherein:

each of the transmitting steps comprises transmitting a spread-spectrum signal from the wireless digital remote station; and each of the receiving steps comprises receiving a spread-spectrum signal at the wireless digital remote station.

6. A method as in claim 5, wherein:

the digital multiple-access system comprises a code-division multiple access (CDMA) type system;

each transmitted spread-spectrum signal comprises a direct sequence encoded spread-spectrum signal; and each received spread-spectrum signal comprises a direct sequence encoded spread-spectrum signal.

7. A method as in claim 4, wherein:

the step of transmitting a preamble signal comprises transmitting an access preamble containing a signature corresponding to the intended one uplink transmission channel; and the step of receiving an acknowledgement signal and perceiving the received acknowledgement signal as an acknowledgement corresponding to the transmitted preamble signal comprises perceiving that the received acknowledgement signal contains a signature corresponding to the signature contained in the access preamble.

8. A method as in claim 7, wherein the step of transmitting the access preamble comprises transmitting the access preamble a plurality of times at sequentially increasing power levels.

9. A method as in claim 7, wherein:

the step of transmitting a preamble signal further comprises transmitting a collision detection preamble signal after receiving the acknowledgement signal;

the method further comprises receiving an acknowledgement corresponding to the collision detection preamble signal; and the transmitting over the one intended uplink transmission channel is further responsive to receipt of the acknowledgement corresponding to the collision detection preamble signal.

10. A code-division-multiple-access (CDMA) wireless base station, comprising:

a CDMA transmitter;

a CDMA receiver; and a controller coupled to the CDMA receiver for responding to signals received via the CDMA receiver and coupled for controlling the CDMA transmitter, such that in operation the CDMA base station is for performing the following steps:

(a) receiving an access attempt signal from a remote station, the access attempt signal identifying an intended one of a plurality of uplink transmission channels serviced through the CDMA wireless base station;

(b) transmitting an access acknowledgement signal corresponding to the received access attempt signal;

(c) after the access acknowledgement, transmitting a start of message indicator sequence as data over a downlink channel corresponding to the intended uplink transmission channel, the start of message indicator sequence indicating to the remote station that the remote station can continue a data transmission over the intended uplink transmission channel; and (d) after the start of message indicator, transmitting data or control information intended for the remote station over the downlink channel corresponding to the intended uplink transmission channel.

11. A CDMA base station as in claim 10, wherein the controller is further responsive to the CDMA receiver and controls the CDMA transmitter, such that in operation the CDMA base station performs a collision detection phase after transmitting the acknowledgement signal and before transmitting over the downlink channel corresponding to the intended uplink transmission channel.

12. A CDMA base station as in claim 10, wherein the data or control information transmitted by the CDMA base station over the downlink channel corresponding to the intended uplink transmission channel comprises closed loop power control information intended for the remote station.

13. A CDMA base station as in claim 10, wherein the CDMA receiver receives data or control information from the mobile station over the intended uplink channel substantially during and after the transmission of start of message indicator sequence.

14. A CDMA base station as in claim 13, wherein data or control information received from the mobile station over the intended uplink channel comprises data and closed loop power control information.

15. A code-division-multiple-access (CDMA) wireless remote station, comprising:

a CDMA transmitter;

a CDMA receiver; and a controller coupled to the CDMA receiver for responding to signals received via the CDMA receiver and coupled for controlling the CDMA transmitter, such that in operation the CDMA remote station is for performing the following steps:

1) transmitting an access signal signifying an attempt to access an intended one of a plurality of uplink transmission channels of a wireless CDMA communication system;

2) receiving a signal from a base station of the system, and perceiving the received signal from the base station as an acknowledgement corresponding to the access signal;

3) transmitting a signal comprising at least one of data or control information, over the one intended uplink transmission channel, responsive to the perceived acknowledgement;

4) if a predetermined sequence is received over a downlink channel corresponding to the one intended uplink transmission channel within a specified time interval, then continuing the transmission over the one intended uplink transmission channel; and 5) if the predetermined sequence is not received over the downlink channel corresponding to the one intended uplink transmission channel within the specified time interval, then stopping the transmission over the one intended uplink transmission channel.

16. A CDMA wireless remote station as in claim 15, wherein the controller is further responsive to the CDMA receiver and controls the CDMA transmitter, such that in operation the CDMA wireless remote station performs a collision detection phase after perceiving the acknowledgement and before transmitting the data or control information over the one intended uplink transmission channel.

17. A CDMA wireless remote station as in claim 15, wherein the controller is further responsive to the CDMA receiver such that in operation the CDMA wireless remote station receives data or control information over the downlink channel corresponding to the one intended uplink transmission channel following receipt of the predetermined sequence.

18. A CDMA wireless remote station as in claim 17, wherein the received data or control information comprises closed loop power control information intended for the remote station.

19. A CDMA wireless remote station as in claim 15, wherein the data or control information transmitted over the intended uplink channel comprises closed loop power control information and data.

20. A CDMA wireless remote station as in claim 15, wherein the controller further controls the CDMA transmitter, such that the transmitting of the access signal comprises repetitively transmitting an access preamble at sequentially increasing power levels, the access preamble comprising a signature corresponding to the one intended uplink transmission channel.

* * * * *